(12) United States Patent
Schmidt

(10) Patent No.: US 6,647,846 B2
(45) Date of Patent: Nov. 18, 2003

(54) MACHINE TOOL WITH FEED SYSTEM

(75) Inventor: Christoph Schmidt, Stuttgart (DE)

(73) Assignee: Trumpf GmbH & Co., Ditzingen (DE)

( * ) Notice: Subject to any disclaimer, the term of this patent is extended or adjusted under 35 U.S.C. 154(b) by 33 days.

(21) Appl. No.: 10/040,992

(22) Filed: Nov. 9, 2001

(65) Prior Publication Data

US 2002/0078809 A1 Jun. 27, 2002

(30) Foreign Application Priority Data

Nov. 18, 2000 (EP) .............................. 00124431

(51) Int. Cl.[7] .............................. B26D 7/06; B65H 1/00; B65G 1/133
(52) U.S. Cl. .................. 83/409; 414/222.1; 414/222.12; 414/751.1
(58) Field of Search ................... 83/409; 414/222.1, 414/222.12, 751.1, 753.1

(56) References Cited

U.S. PATENT DOCUMENTS

| | | | | |
|---|---|---|---|---|
| 3,456,814 A | * | 7/1969 | Bautz | 198/621.2 |
| 3,563,123 A | * | 2/1971 | Leibinger | 83/237 |
| 3,717,061 A | * | 2/1973 | Daniels | 83/409 |
| 4,023,788 A | * | 5/1977 | Herb et al. | 269/73 |
| 4,274,801 A | * | 6/1981 | Herb et al. | 414/751.1 |
| 4,434,693 A | * | 3/1984 | Hosoi et al. | 83/76.9 |
| 4,523,749 A | * | 6/1985 | Kindgren et al. | 269/32 |
| 4,548,115 A | * | 10/1985 | Martin et al. | 83/409 |
| 4,646,600 A | * | 3/1987 | Flick et al. | 83/136 |
| 4,775,135 A | * | 10/1988 | Leibinger et al. | 269/303 |
| 4,802,567 A | * | 2/1989 | Ikeda et al. | 198/345.1 |
| 4,951,375 A | * | 8/1990 | Erlenmaier | 483/4 |
| 4,990,080 A | * | 2/1991 | Kakimoto | 425/290 |
| 5,027,683 A | * | 7/1991 | Kakimoto | 83/76.6 |
| 5,326,335 A | * | 7/1994 | Takei | 476/67 |
| 6,145,424 A | * | 11/2000 | Matsuda et al. | 83/227 |

* cited by examiner

Primary Examiner—Allan N. Shoap
Assistant Examiner—Isaac N Hamilton
(74) Attorney, Agent, or Firm—Pepe & Hazard LLP

(57) ABSTRACT

A machine tool having a C-shaped frame has a workpiece processing station adjacent the open end of the throat, and an elongated guide rail extends in a first axis perpendicularly to the throat. A carrier extends along the guide rail, and a multiplicity of guide units are spaced along and movable on the carrier in the first axis. Workpiece clamping units are carried by the guide units, and drive means moves the guide units on the carrier. The guide rail is movable in the throat along a second axis perpendicular to the first axis, and a second carrier supported on the frame extends in a second axis parallel to the throat. A multiplicity of guide elements is spaced along and movable on the second carrier and supports the guide rail for movement in the second axis of the second guide rail.

18 Claims, 4 Drawing Sheets

MACHINE TOOL WITH FEED SYSTEM

BACKGROUND OF THE INVENTION

This invention relates to a machine tool incorporating a processing station and at least one power driven feed system to move a workpiece and/or a machining tool in the direction of an axis of travel relative to the processing station. The machine tool has at least one directional guide with a power driven carriage that moves in the direction of the axis of travel, and carries at least one clamping device for a workpiece and/or at least one holder for a machining tool.

Such a machine tool may also incorporate at least one motorized feed system by which a workpiece and/or a machining tool can be moved in a plane defined by first and second axes of travel relative to the processing station. The machine has two directional guides of which the first directional guide moves a first power driven carriage with at least one workpiece-clamping device and/or at least one machining tool holder in the direction of the first axis of travel, while the second directional guide is provided with a second carriage on which the first carriage and at least one workpiece platen supporting a workpiece can be moved along the second axis of travel.

A machine tool of the general type mentioned above, in the form of a punch press, is described in DE-A-38 18 001 (U.S. Pat. No. 4,951,375). That machine employs as its first carriage a rigidly constructed slide which is stationary in the direction of a first axis of travel and movable in the direction of a second axis of travel. Along the first axis of travel, the slide drives a single, moving workpiece support rail which is provided with claw-type holders or clamps for the workpiece to be processed and with tool cartridges for holding machining tools.

Moving the workpiece support rail relative to the rigid slide carrying it positions the workpiece which is held by the claws associated with the workpiece support rail in the direction of the first axis of travel. That relative movement in the direction of the first axis of travel may also bring the machining tools mounted on the workpiece support rail into an operational and, respectively, switching position adjacent the processing station of that prior art machine.

The workpiece support rail of the punch press illustrated in DE-A-38 18 001 (U.S. Pat. No. 4,951,375), to carry this volume of components, tools and workpieces, must be designed for moving a relatively heavy weight on the associated rigid slide. It is also particularly important to remember that optimal operation of that prior art punch press requires a very precise positioning of both the workpiece clamped on the workpiece support rail and the tools mounted on that workpiece support rail. Accordingly, the workpiece support rail employed in the earlier design has a relatively large cross section and a highly rigid structure. It also bears considering that to operate the prior art punch press, the workpiece support rail has to be moved in the direction of the first axis of travel.

A machine of the second type mentioned above is currently being marketed by "TRUMPF GmbH+Co. KG" of 71254 Ditzingen Germany, under the model name "TRUMATIC® 500 ROTATION". In terms of the first directional guide of its feed system, this machine essentially follows the prior art design illustrated and described in DE-A-38 18 001. Specifically, the "TRUMATIC® 500 ROTATION" employs as its first carriage a rigid slide which is stationary in the direction of the first axis of travel. The slide is connected to equally rigid supports, which extend in the direction of the second axis of travel to form a unitary overall rigid structure. A workpiece holder in the form of a platen is mounted on the above-mentioned rigid supports and can be moved on a power driven second carriage, together with the other parts of the overall structure, in the direction of the second axis of travel.

The rigidity of the overall structure encompassing the rigid slide and the rigid supports holding the workpiece platen serves to permit the precise positioning of the workpiece to be machined and of the machining tools employed for that purpose. Operating the "TRUMATIC® 500 ROTATION" involves the movement of a corresponding large structure and heavy weight in the direction of the second axis of travel.

It is the objective of this invention to reduce the mass that must be moved in the operation of the machine, while maintaining the same precise guiding and positioning of the workpiece(s) and/or of the machining tool(s).

SUMMARY OF THE INVENTION

It has now been found that the foregoing and related objects may be readily attained in a machine tool having a frame having upper and lower arms providing a throat therebetween and a workpiece processing station adjacent the open end of the throat. An elongated guide rail extends in a first axis perpendicularly to the throat, and a work support table is provided.

A first carrier extends along the guide rail, and a multiplicity of guide units are spaced along and movable on the carrier in the first axis. A multiplicity of workpiece clamping units are carried by the guide units, and the machine tool also includes drive means for moving the guide units with the clamping units on the carrier along the first axis whereby a workpiece clamped thereby may be moved in the first axis relative to the work support table.

The guide rail is movable in the throat along a second axis perpendicular to the first axis, and there are included a second carrier supported on the frame and extending in a second axis parallel to the throat. A multiplicity of guide elements is spaced along and movable on the second carrier and support the guide rail for movement in the second axis of the second guide rail.

At least one tool holder is mounted on one of the guide units and movable on the first carrier, and the work support table is supported on the guide elements of the second carrier for movement thereon. The guide units on the guide rail are connected to one another by at least one connecting element. The guide elements on the second carrier are connected to one another by at least one connecting element. The connecting elements may be a connecting bar, or a connecting plate.

The guide units are connected by a gear rack extending along the first carrier in the direction of the first axis, and the gear rack meshes with at least one drive pinion of a linear drive for moving the guide units on the first carrier in the direction of the first axis of travel. The guide elements on the second carrier are connected by a gear rack extending along the second carrier in the direction of the second axis of travel, and the gear rack meshes with at least one drive pinion of a linear drive for moving the guide elements on the second carrier in the direction of the second axis of travel.

The gear rack is attached to at least one connecting element which serves to connect associated guide units. The gear rack is attached to at least one connecting element which serves to connect associated guide elements. The second carrier comprises a platen with at least one guide member provided on the top surface of the platen for steering the guide elements on the second carrier in the direction of the second axis of travel. The guide units on the first carrier are slides which are consecutively tandem-joined in the direction of their movement. The guide elements on the second carrier are slides which are consecutively tandem-joined in the direction of their movement.

As will be appreciated, the mass that must be moved in the machine tool concerned in the direction of the axis of travel is reduced substantially, in a machine embodying the present invention. The workpiece support rail employed in corresponding prior art machines is replaced by an array of individually mounted guide units whose combined total mass is less than that of a corresponding prior art workpiece support rail. In the present invention, precise workpiece and tool positioning is obtained due to the rigidity of the carriage structure in conjunction with an appropriately precise mounting of the guide units of this invention on that carriage.

In the prior art designs, all support and clamping devices for the workpiece and for the machining tools are jointly mounted on a common component, that being the traditional support rail. In the present invention, these devices are spatially distributed, and this distribution of the guide and load transfer functions over several relatively compact guide units. This makes it possible to transfer the loads bearing on the individual guide units into the carriage structure next to their point of contact. This, in turn, given good rigidity of the overall structure encompassing the carriage and the guide units, assures good support and positioning of the workpiece and/or tool holding devices. Consequently, the machine tool does not need the rigid supports which are provided in the prior art designs for mounting the workpiece holders in the direction of the second axis of travel. This requires the separation of the movement of the first carriage from the transport of the workpiece platen.

Guide units can be used which have less bulk than the conventional rigid supports. Precise workpiece and tool positioning is obtained by means of the rigid second carriage and the design of the mounts for the guide units of the second carriage. The reduction in bulk and weight makes it possible to run the feed system with relatively fast acceleration, permitting high processing throughput rates in both cases.

The design concept of the new machine tool combines the advantage of relatively small weight to be moved in the direction of the first axis of travel and the advantage of relatively small weight to be moved in the direction of the second axis of travel.

Within the framework of the present invention, it is possible to equip each guide unit on the first carriage and/or each guide unit on the second carriage with its own directional drive. However, according to the present invention, the preferred machine design employs a common drive system for the several guide units.

It utilizes a simple structural design for the connection between the guide units on the first carriage and in the guide units on the second carriage by rack-and-pinion mechanism, which can also serve as part of the traversing drive for the various guide units. Also, the design is such that the driving force applied by the pinion to the corresponding rack section translates over a short distance into motive power for several of the guide units to be driven.

BRIEF DESCRIPTION OF THE ATTACHED DRAWINGS

The following description will explain this invention in more detail with the aid of schematic illustrations in which FIG. 1 is a partially diagrammatic perspective view of a machine tool in the form of a punch press with a C-frame and embodying the present invention with portions fragmentarily illustrated;

DETAILED DESCRIPTION OF THE PREFERRED EMBODIMENT

Figure 1:
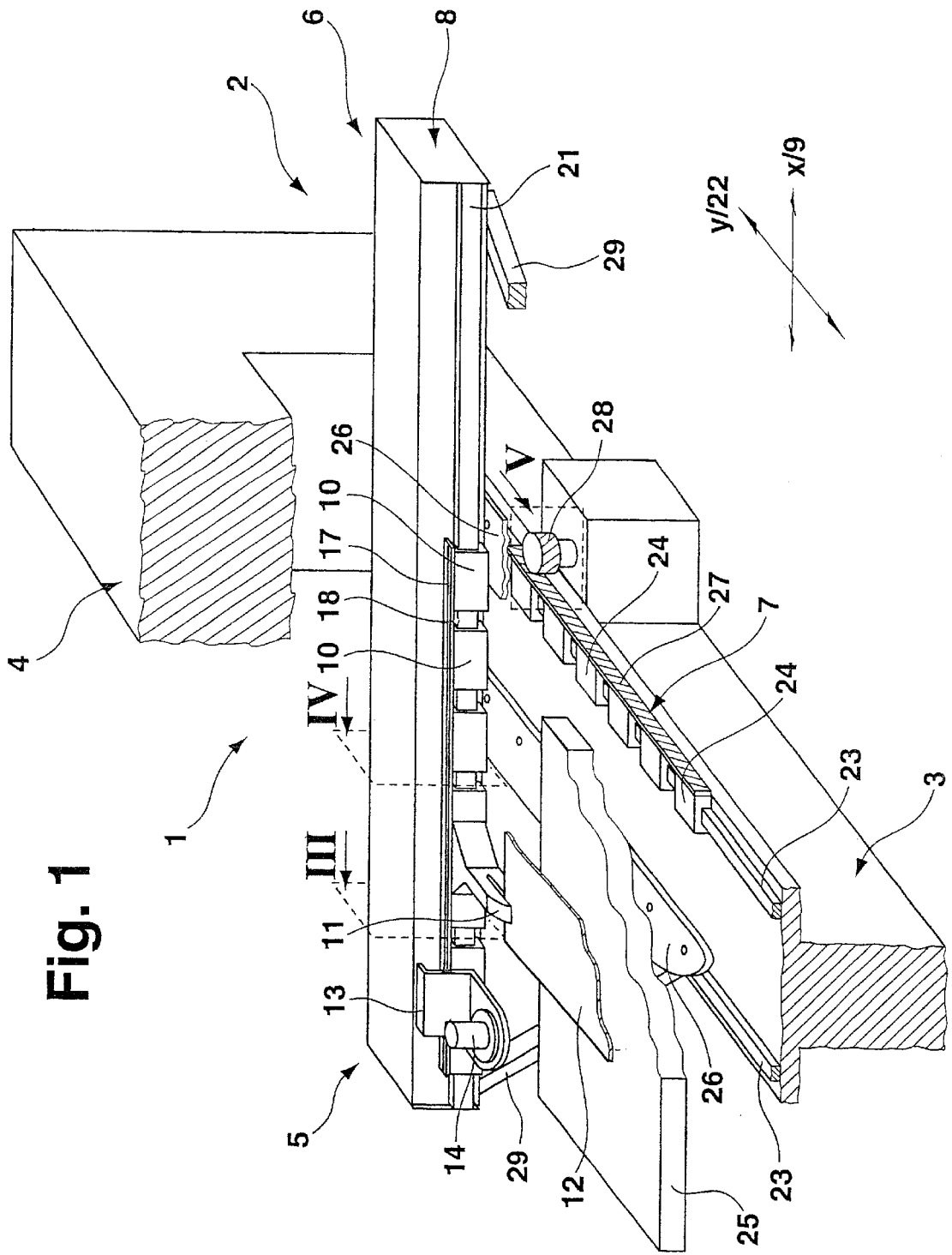

FIG. 1 shows the basic configuration of a machine tool in the form of a punch press 1 which incorporates a C-frame 2 with a lower arm 3 and an upper arm 4. In FIG. 1 the arms 3, 4 of the frame are fragmentarily illustrated in section.

The processing (e.g., punching) station, (not illustrated), is positioned adjacent the free end of the arms 3, 4 of the frame of the punch press 1. This punch station is conventional in design and includes a tool holder (not shown), in the lower arm 3, for the punch press bottom die and, mounted in the upper arm 4, a tool holder (not shown) in the ram (not shown) of the punch press.

The space between the lower arm 3 and the upper arm 4 of the frame, i.e., the "throat" of the punch press 1, accommodates a feed system in the form of an X-Y coordinate guide assembly 5 which includes a first directional guide 6 and a second directional guide 7.

The first directional guide 6 consists of a first carriage in the form of a rigid carrier rail 8 which extends in the direction of a first coordinate axis of travel (x-axis). Along its x-axis the carrier rail 8 is provided with a multiplicity of moving, power driven guide units in the form of slides 10. Directly attached to the slides 10, and spaced apart along the x-axis, are workpiece-clamping devices in the form of claws 11 holding a metal sheet 12, and interchangeable tool cartridges 13 which serve to hold the machining (i.e., punching) tools 14.

Figure 3:
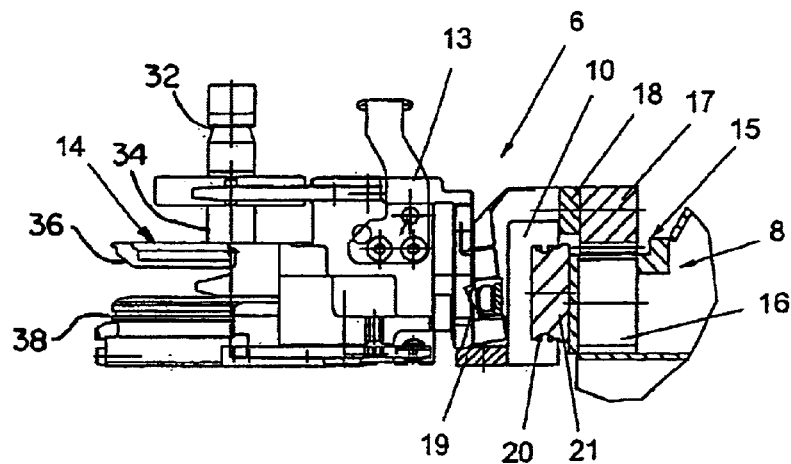
FIG. 3 is a fragmentary sectional view of the punch press of FIGS. 1–3 in the plane III indicated in FIG. 1.
Figure 4:
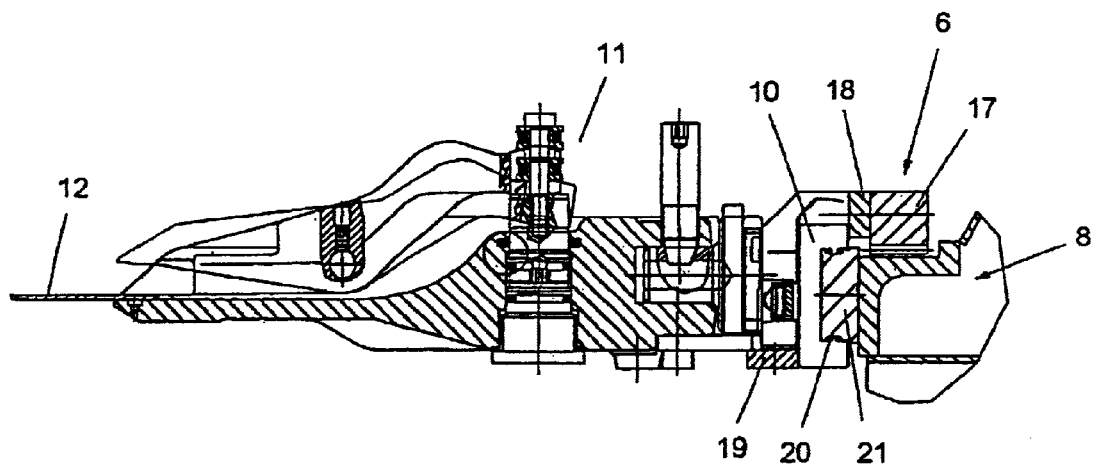
FIG. 4 is a section view of the punch press of FIGS. 1 to 3 along the plane IV indicated in FIG. 1.

The slides 10 are moved in the direction of the x-axis by means of a linear drive 15, depicted in detail in FIG. 3 and including, next to the drive pinion 16 on the carrier rail 8, a gear rack 17 that is connected to the slides 10. In the direction of the x-axis, the rack is composed of several consecutively contiguous sections. As shown in FIG. 3 and 4, these rack sections are attached to a connecting bar 18 which is screw connected to the slides 10. The connecting bar 18 links all slides 10 and extends along all of the slides 10.

Another connecting element for all slides 10 is the connecting bar 19 at the lower end of the slides 10. The connecting bar 19 extends from the slides 10 toward the tool cartridges 13 and the claws 11, with its extending portion serving as an effective positioning stop in the direction of gravity or support for the tool cartridges 13 and the claws 11. By means of roller (i.e., ball) contact bearings 20 (seen in FIGS. 3 and 4) the slides 10 are in positive contact with a guide rail 21 on the carrier rail 8, permitting movement in the direction of the x-axis. Each claw or clamp 11 and each tool cartridge 13 is associated with a dedicated slide 10. The claws or clamps 11 and the tool cartridges 13 are appropriately distributed over the multiplicity of slides 10. Consequently, each slide 10 supports and transfers to the rigid carrier rail 8 only a fraction of the load on the claws 11 and tool cartridges 13. Accordingly, the individual slides 10 may be relatively small in size so that the dimensions and weight of each of them as well as of all of them combined is relatively small.

The claws 11 and the tool cartridges 13 including the punching tools 14 are of a conventional design. A punching tool is shown in FIG. 3 and includes a punch 32 with an adjustment ring, the stamping die 34, a stripper 36 and a die plate 38.

The carrier rail 8 is fixed [on] or stationary in the direction of the x-axis but it can be moved in the direction of the y-axis. The carrier rail 8 [and] travels along the rigid lower arm 3 of the frame which includes a second carriage. [This] The arm 3 supports a platen or work support table 25, and [,] it is provided with guide rails 23 for guiding the carrier rail 8 on the top surface of the platen or work table 25[,. [This arm 3 is provided with guide rails 23 [which] support the carrier rail 8 [by] on guide units consisting of slides 24 that move in the direction of the y-axis. In FIG. 1 the slides 24 that serve to guide the carrier rail 8 on the lower arm 3 are obscured by the carrier rail 8. Roller (spherical) bearings 30 provide a direct contact bearing for the slides 24 on the lower arm 3.

The slides 24 serving to guide the carrier rail 8 connect to correspondingly matching slides 24 which travel along the guide rail 23 of the lower arm 3 for a workpiece support in the form of the usual two-part support table or workpiece platen 25. The connection between the slides 24 associated with the carrier rail [9]8 is established by junction elements in the form of connecting plates 26 which are not of a rigid structure. Consequently, the weight of the carrier rail 8 and its accessories and the weight of the workpiece platen 25 are essentially distributed over various slides 24 which are associated almost exclusively with the carrier rail 8 or almost exclusively with the workpiece platen 25. Therefore, as in the case of the slides 10 described further above, the slides 24 can be kept relatively small, with a correspondingly small bulk and weight.

Figure 2:
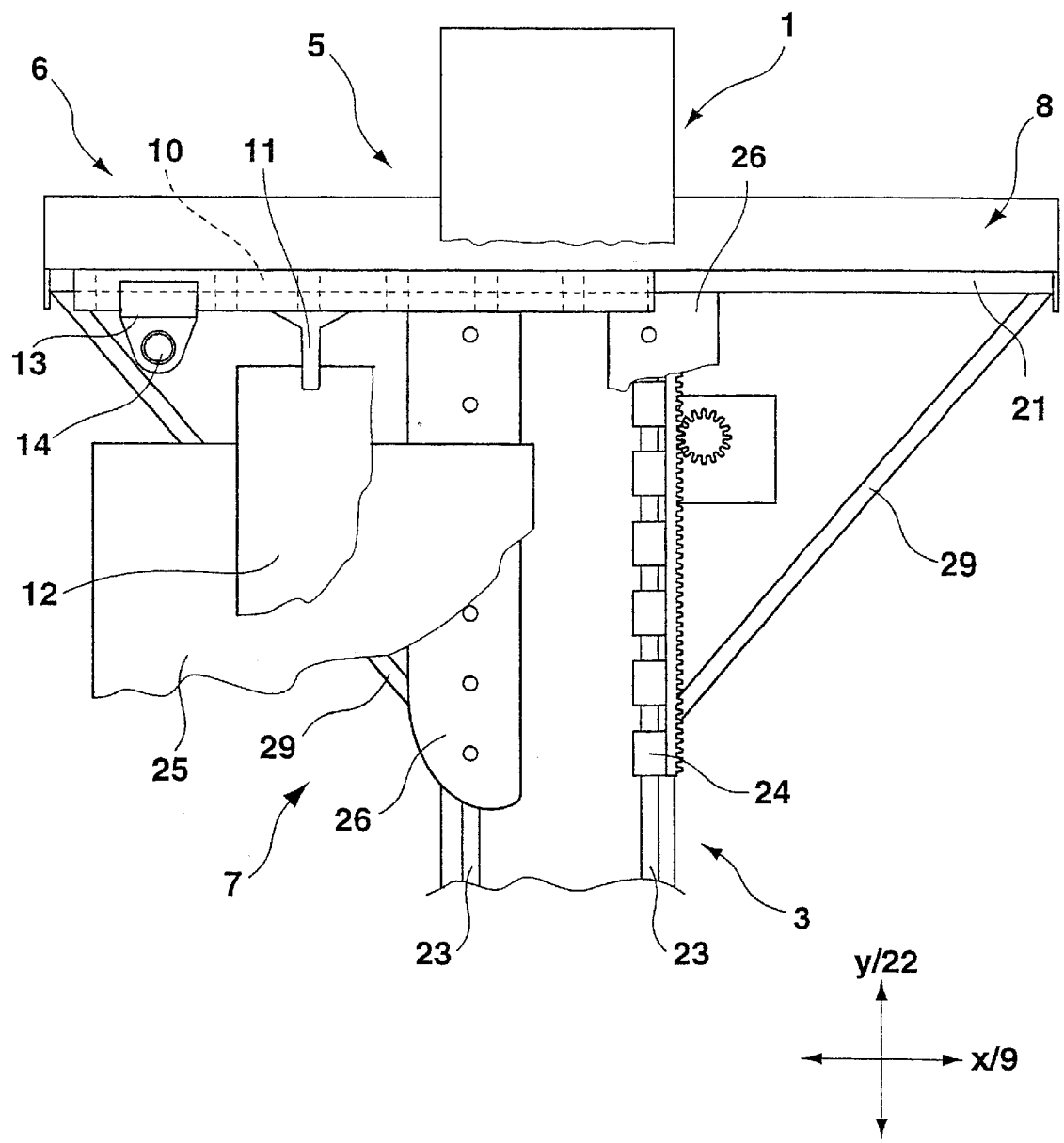
FIG. 2 is a fragmentary top view of the machine tool of FIG. 1 showing the lower arm of the frame and elements of the guidance system and work support table.
Figure 5:
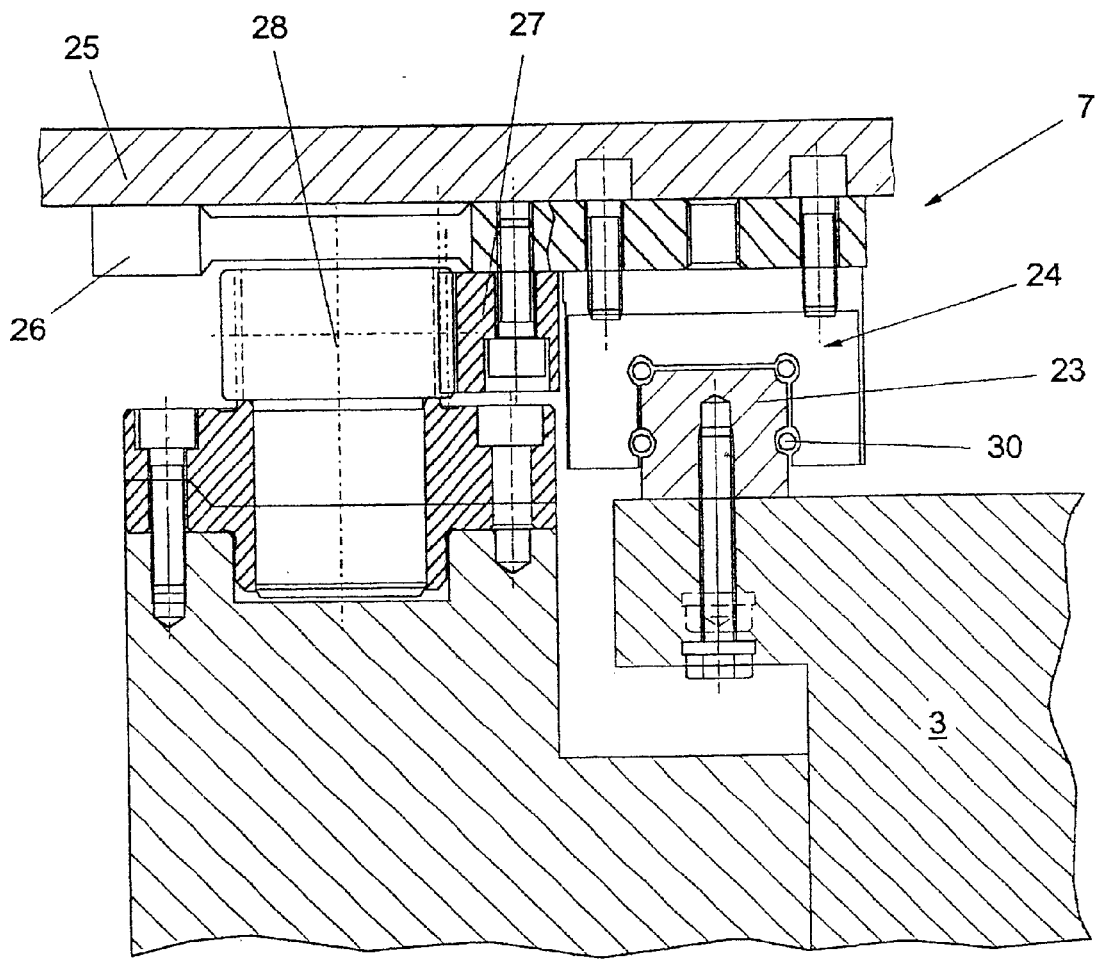
FIG. 5 is a fragmentary sectional view of the second directional guide, work table and from the punch press of FIGS. 1 to 4 in the plane V indicated in FIG. 1.

As shown in FIG. 5, a gear rack 27 is attached to the bottom surface of the connecting plates 26, and this rack, similarly to the rack 17 that extends along the x-axis, is composed of individual segments. The rack 27 meshes with a drive pinion 28 of a linear drive mounted in a stationary position on the lower arm 3 which serves to move the slides 24 on the lower arm 3 in the direction of the y-axis. By virtue of the connection established through the connecting plates 26 between the slides 24 associated with the carrier rail 8 and the slides 24 associated with the workpiece platen 25, the workpiece platen 25 and the carrier rail 8 are jointly moved in the direction of the y-axis. The struts 29 shown in FIG. 1 and 2 extending from the rail 8 to the connecting plates 26 serve to stabilize the carrier rail 8.

During the operation of the punch press 1, typically under a numerical control system, the metal sheet 12 can be positioned, in the desired manner and in traditional fashion, in the plane defined by the x-axis and the y-axis relative to the processing station (not illustrated). The punching tools in the cartridges 13 which are held in place on the carrier rail 8 can thus be mounted in or removed from the tool holders in the punching station. A detailed description of this essentially conventional process is not necessary here and reference may be made to the appropriate, comprehensive explanations contained in German Patent DE-A-38 18 001 (U.S. Pat. No. 4,951,375). The contents of that publication are expressly included as a part of this present disclosure.

A fact of particular significance for the punch press 1 is that, in its operation, only a relatively small volume in terms of bulk and weight need to be moved on the carrier rail 8 in the direction of the x-axis and, on the lower arm 3, in the direction of the y-axis. This feature makes it possible in the case of the punch press 1 to manipulate and control even high acceleration rates of the x-y coordinate guide assembly and thus achieve high workpiece processing speeds.

Having thus described the invention, what is claimed is:

1. A machine tool having:
   (a) a frame vertically spaced upper and lower arms with a web at one end and providing a throat therebetween open at its end spaced from said web, said throat having a workpiece processing station adjacent the open end thereof;
   (b) an elongated guide rail extending in a first axis perpendicularly to said throat;
   (c) a work support table;
   (d) a first carrier extending along said guide rail;
   (e) a multiplicity of guide units spaced along and movable on said carrier in said first axis;
   (f) a connecting element connecting said guide units for concurrent movement with said carrier, said connecting elements including a gear rack extending along said first carrier in the direction of said first axis, said gear rack meshing with a least one drive pinion of a linear drive for moving the guide units on the first carrier in the direction of the first axis;
   (g) a multiplicity of workpiece clamping units carried by said guide units; and
   (h) drive means for moving said guide units with said clamping units on said carrier along said first axis whereby a workpiece clamped thereby may be moved in said first axis relative to said work support table.

2. The machine tool in accordance with claim 1 wherein said guide rail is movable in said throat along a second axis perpendicular to said first axis.

3. The machine tool in accordance with claim 1 wherein there is at least one tool holder mounted on one of said guide units and movable on said first carrier.

4. The machine tool in accordance with claim 1 wherein said guide units on said guide rail are connected to one another by at least one connecting element.

5. The machine tool in accordance with claim 4 wherein said connecting element is a connecting bar.

6. The machine tool in accordance with claim 4 wherein said guide units are connected by a gear rack extending along said first carrier in the direction of said first axis, said gear rack meshing with at least one drive pinion of a linear drive for moving the guide units on the first carrier in the direction of the first axis of travel.

7. The machine tool in accordance with claim 6 wherein said gear rack is attached to at least one connecting element which serves to connect associated guide units.

8. The machine tool in accordance with claim 6 wherein said guide units on said first carrier are slides which are consecutively tandem-joined for movement in the direction of said first axis.

9. A machine tool having:
   (a) a frame having vertically spaced upper and lower arms with a web at one end and providing a throat therebetween open at its end spaced from said web, said throat having a workpiece processing station adjacent the open end thereof;

(b) an elongated guide rail extending in a first axis perpendicularly to said throat movable in said throat along a second axis perpendicular to said first axis;

(c) a work support table;

(d) a first carrier extending along said guide rail;

(e) a multiplicity of guide units spaced along and movable on said carrier in said first axis;

(f) a multiplicity of workpiece clamping units carried by said guide units; and (g) drive means for moving said guide units with said clamping units on said first carrier along said first axis whereby a workpiece clamped thereby may be moved in said first axis relative to said work support table;

(h) a second carrier supported on said frame and extending in a second axis parallel to said throat; and (i) a multiplicity of guide elements spaced along and movable on said second carrier and supporting said guide rail for movement in said second axis, the weight of said first carrier and of said work support being distributed over a multiplicity of guide units.

10. The machine tool in accordance with claim 9 wherein said work support table is supported on said guide elements of said second carrier for movement thereon.

11. The machine tool in accordance with claim 9 wherein said guide elements on said second carrier are connected to one another by at least one connecting element.

12. The machine tool in accordance with claim 11 wherein said connecting element is a connecting plate.

13. The machine tool in accordance with claim 11 wherein said guide elements are connected by a gear rack extending along said second carrier in the direction of said second axis, said gear rack meshing with at least one drive pinion of a linear drive for moving the guide elements on the second carrier in the direction of the second axis.

14. The machine tool in accordance with claim 13 wherein said guide elements on the second carrier are slides which are consecutively tandem-joined for movement in the direction of said second axis.

15. The machine tool in accordance with claim 13 wherein the second carrier comprises a platen having a top surface and at least one guide member provided on top surface of said platen for steering the guide elements on said second carrier in the direction of the second axis.

16. The machine tool in accordance with claim 13 wherein said gear rack is attached to at least one connecting element which serves to connect associated guide elements.

17. A machine tool with at least one processing station and having at least one feed mechanism (5) for driving at least one workpiece (12) and/or at least one processing tool (14) which can be power-driven in the direction of at least one axis of travel (X-axis) relative to the processing station, said feed mechanism including at least one directional guide (6) with a carrier structure (8) along which at least one holder (11) for a workpiece (12) and/or at least one holder (13) for a processing tool (14) can be driven in the direction of said one axis of travel (X-axis), said directional guide (6) comprising a multiplicity of individually supported guide units (10) which can be power-driven along the carrier structure (8) in the direction of said one axis of travel (X-axis) and with the holders (11, 13) arranged in distributed fashion on the guide units (10), the guide units (10) on the carrier structure (8) being connected to one another by at least one of the group consisting of (a) at least one toothed rack section and (b) at least one toothed rack section being mounted on guide units (10) on the carrier structure (8) and attached to at least one connecting element (18) mutually connecting cooperating guide units (10), said toothed rack section extending in the direction of said on axis of travel (X-axis) and constituting a part of the drive mechanism (15) for moving the guide units (10) along the carrier structure (8) in the direction of said one axis of travel (X-axis), said drive mechanism including at least one drive pinion (16) that meshes with the toothed rack section.

18. A machine tool with at least one processing station and having at least one feed mechanism (5) for driving at least one workpiece (12) and/or at least one processing tool (14) in a plane defined by first (X-) and second (Y-) axes of travel relative to the processing station and which includes two directional guides (6, 7), the first directional guide (6) having a first carrier structure (8) along which at least one holder (11) for a workpiece (12) and/or at least one holder (13) for a processing tool (14) is power-driven in the direction of the first axis of travel (X-axis), the second directional guide (7) having a second carrier structure (3) along which the first carrier structure (8) and at least one work support (25) supporting a workpiece (12) in the direction of gravity is power-guided in the direction of the second axis of travel (Y-axis), said first carrier structure including a multiplicity of guide units (24) that can be power-driven along the second carrier structure (3) in the direction of the second axis of travel (Y-axis), and a least in part associated with either the first carrier structure (8) or with the work support (25), whereby the weight of the first carrier structure (8) and the weight of the work support (25) are distributed over several different guide units (24).

\* \* \* \* \*

UNITED STATES PATENT AND TRADEMARK OFFICE
CERTIFICATE OF CORRECTION

PATENT NO. : 6,647,846 B2
DATED : November 18, 2003
INVENTOR(S) : Christoph Schmidt It is certified that error appears in the above-identified patent and that said Letters Patent is hereby corrected as shown below:

Column 8,
Line 20, "on" should be -- one --;
Line 43, "a" should be -- at --.

Signed and Sealed this

Third Day of February, 2004

JON W. DUDAS
*Acting Director of the United States Patent and Trademark Office*